United States Patent [19]

McClain

[11] 3,774,052

[45] Nov. 20, 1973

[54] SIGNAL DETECTOR CIRCUIT

[75] Inventor: Herbert D. McClain, Tipp City, Ohio

[73] Assignee: The National Cash Register Company, Dayton, Ohio

[22] Filed: Feb. 28, 1972

[21] Appl. No.: 229,932

[52] U.S. Cl. .................... 307/238, 307/246, 307/255

[51] Int. Cl. .......................... H03k 5/00, H03k 17/56

[58] Field of Search .............................. 307/229, 307/255, 238, 231, 246

[56] References Cited

UNITED STATES PATENTS

| | | | |
|---|---|---|---|
| 3,697,877 | 10/1972 | Godfrey | 307/229 X |
| 3,421,020 | 1/1969 | Ringelhaan | 307/229 X |
| 2,864,961 | 12/1958 | Lohman et al. | 307/255 |
| 3,591,854 | 7/1971 | Cole | 307/295 |

*Primary Examiner*—John W. Huckert
*Assistant Examiner*—B. P. Davis
*Attorney*—J. T. Cavender et al.

[57] ABSTRACT

There is disclosed a signal detector circuit for recognizing the presence of a sinusoidal input signal. The circuit includes complementary switching transistors for deenergizing first and second capacitors during respective positive and negative half cycles of the input signal. Further, first and second amplifying means are provided for providing signals which change respectively from positive to negative and negative to positive voltages as the two capacitors are discharged. A comparator provides an output signal when the two amplifier signals change polarity with respect to one another.

9 Claims, 2 Drawing Figures

SIGNAL DETECTOR CIRCUIT

This invention relates to a detector circuit and more particularly to a circuit for detecting the presence of an alternating current signal applied thereto.

One manner of achieving digital communication between a data terminal and a central processor located some distance away from the data terminal is through existing telephone lines. Because telephone lines are not usable for pure digital signals, that is direct current signals of one or another voltage magnitudes, it is necessary to transmit the desired information using an audio type signal. One such scheme is known as frequency shift keying (FSK), in which a sinusoidal wave of one or another frequency, respectively representing the binary "0" and binary "1" digits, is transmitted. Because there is no constant communication between the data terminal and the central processor, the signal being sent is of a sporadic nature, that is for one portion of time no sinusoidal signal is transmitted and for another portion of time a sinusoidal signal is transmitted. During the time when no signal is being transmitted, a certain amount of noise appears on the line and for certain short durations, this noise can appear as a sinusoidal wave. It is necessary to prevent the central processor from detecting the noise signal as information signal.

One manner by which this detecting is accomplished is through the use of a circuit to detect a sinusoidal signal as opposed to a noise signal. The detector circuit makes use of the fact that, over a given time increment, the sinusoidal signal has alternating polarity of voltage of a relatively large amplitude.

In accordance with one preferred embodiment of this invention, there is provided a detector circuit for providing an output signal indicating the presence of an established alternating current input signal applied thereto. The detector circuit includes first and second energy storing devices and input means for causing the devices to store initial energy prior to the provision of the input signal. The input means further periodically deenergizes the first device during the occurrence of positive half cycles of this input signal and periodically deenergizes the second device during the negative half cycle of the input signal. The circuit also includes first amplifying means responsive to the energy stored by the first device for providing a signal which changes from a first to a second polarity as the energy stored by the first device decreases, and second amplifying means responsive to the energy stored by the second device for providing a signal which changes from the second to the first polarity as the energy stored by the second device decreases. Additionally, the circuit includes comparing means for providing the output signal whenever the value of the first and second amplifying means signals change polarity with respect to one another.

A detailed description of one preferred embodiment of the invention is hereinafter given with reference to the following FIGURES in which.

Figure 1:
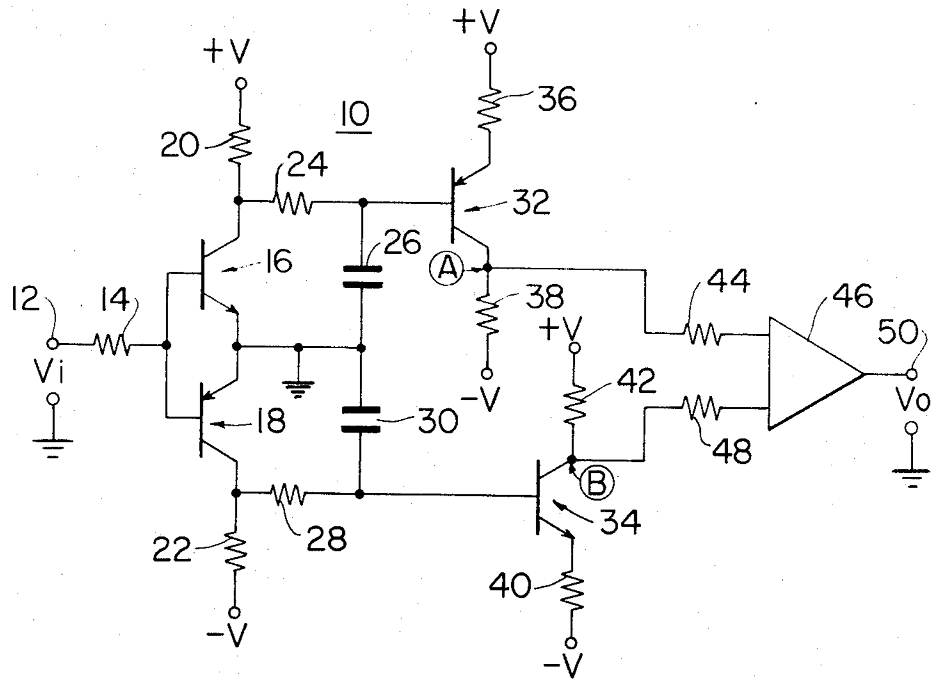
FIG. 1 shows a circuit diagram of one embodiment of the invention.

Referring now to FIG. 1 there is shown a signal detector circuit 10 which is responsive to an input voltage $V_i$ applied between input terminal 12 and ground. Input terminal 12 is connected to current limiting resistor 14 which in turn is connected to the base electrode of each of N-P-N transistor 16 and P-N-P transistor 18. The emitter electrodes of transistors 16 and 18 are coupled together and to ground. The collector electrode of transistor 16 is coupled through resistor 20 to a source of direct current positive voltage +V. The collector electrode of transistor 18 is coupled through resistor 22 to a source of direct current negative voltage −V.

The collector electrode of transistor 16 is also coupled through resistor 24 to one end of capacitor 26, the other end of which is coupled to ground. The collector of transistor 18 is coupled through resistor 28 to one end of capacitor 30, the other end of which is coupled to ground. The junction of resistor 24 and capacitor 26 is coupled to the base electrode of P-N-P transistor 32 and the junction of resistor 28 and capacitor 30 is coupled to the base electrode of N-P-N transistor 34.

The emitter electrode of transistor 32 is coupled through resistor 36 to the source of direct current positive voltage +V and the collector electrode of transistor 32 is connected through resistor 38 to the source of direct current negative voltage −V. The eimtter electrode of transistor 34 is connected through resistor 40 to the source of direct current negative voltage −V and the collector electrode of transistor 34 is connected through resistor 42 to the source of direct current positive voltage +V.

The collector of transistor 32 is also coupled through current limiting resistor 44 to one input of differential amplifier 46. Similarly the collector electrode of transistor 34 is connected through current limiting resistor 48 to a second input of differential amplifier 46. The output signal of detector circuit 10 is taken between the output terminal 50 of differential amplifier 46 and ground.

The operation of detector circuit 10 will now be described, with reference being made to the four waveforms $V_i$, B, A, and $V_o$ shown in FIG. 2. The waveforms A and B are respectively the voltages at the collectors of transistors 32 and 34, respectively labeled points A and B.

Prior to the input signal $V_i$ becoming the sinusoidal waveform, the voltage at terminal 12 with respect to ground is approximately zero volts. During this time both transistors 16 and 18 are nonconductive since the emitter electrodes thereof are grounded. Therefore, capacitor 26 becomes charged to +V volts by current flowing thereto from source +V through resistor 20 and resistor 24, and capacitor 30 becomes charged to −V volts by current flowing thereto from source −V through resistor 22 and resistor 28. Thus, the base of transistor 32 will be at a +V volts and, since the emitter of transistor 32 is also at +V volts, transistor 32 will be cutoff and the collector voltage at point A will be −V volts. Similarly, since the voltage applied to the base of transistor 34 is −V volts and the eimtter thereof is at −V volts, transistor 34 is cutoff and the collector voltage of transistor 34 at point B will be +V volts. Under this condition, the voltage $V_o$ at terminal 50 will be positive with respect to ground.

When the input signal $V_i$ becomes the sinusoidal waveform, the positive half cycles thereof render transistor 16 conductive and the negative half cycles thereof render transistor 18 conductive. It should be noted that the transistors 16 and 18 become conductive when the magnitude of the input signal $V_i$ is respectively above or below 0.6 volts; for a large amplitude signal, this will be for substantially all of the half cycle. When transistor 16 becomes conductive, capacitor 26 will begin discharging to ground through resistor 24 and the collector-emitter path of transistor 16. During the time of the negative half cycle, transistor 16 is nonconductive and capacitor 26 is recharged by the current from source +V applied through resistors 20 and 24. It should be noted that the amount of discharge during the first positive half cycle of the sinusoidal signal will be greater than the amount of recharge during the first negative half cycle because the initial voltage across capacitor 26 is +V volts and the discharge time constant is $R_{24}C_{26}$, whereas, the recharge time constant is $(R_{20}+R_{24})C$. This discharging and subsequent recharging during each cycle of the sinusoidal input signal continues with the amount of discharging decreasing and the amount of recharging increasing as the net voltage across capacitor 26 falls. Eventually the amount of discharge of capacitor 26 during the positive half cycle equals to the amount of recharge of capacitor 26 during the negative half cycle. The value of the voltage at the junction of resistor 24 and capacitor 26 at which this occurs is dependent of the value of resistors 20 and 24 and will be equal to:

$$(R_{24}/R_{20} + R_{24})\ V,$$

where $R_{24}$ is the value of resistor 24, $R_{20}$ is the value of resistor $R_{20}$ and V is the magnitude of voltage +V. The same thing happens with respect to capacitor 30, that is, capacitor 30 discharges through resistor 28 and the collector-emitter path of transistor 18 during the negative half cycles and is recharged during the positive half cycles by current from source −V flowing through resistors 22 and 28. The value of the voltage at the junction of resistor 28 and capacitor 30 at which net discharge ceases is:

$$-\ (R_{28}/R_{22} + R_{28})\ V.$$

Where $R_{28}$ is the value of resistor 28, $R_{22}$ is the value of resistor 24 and V is the magnitude of voltage −V.

When the voltage applied to the base of transistor 32 from the junction of capacitor 26 and resistor 24 falls 0.6 volts, the base-emitter junction of transistor 32 becomes forward biased and current begins to flow between the emitter and collector thereof. This causes the voltage at point A to begin to increase from the initial voltage of −V volts, and as the voltage at the base of transistor 32 continues to fall, the voltage at point A becomes more and more positive. This continues until the time when transistor 32 becomes saturated. If resistor 36 is selected to be larger than resistor 38, the voltage at point A will be a positive value when transistor 32 becomes saturated. It should be noted that once transistor 32 becomes saturated, the voltage at the base thereof will be six-tenths of a volt less than the saturated emitter voltage, regardless of the values of resistors 20 and 24. The waveform labeled A in FIG. 2 shows the voltage at point A as the voltage applied to the base of transistor 32 decreases.

A similar occurrence takes place at point B. As the voltage applied to the base of transistor 34 begins increasing from −V volts, the voltage at point B which initially had been +V volts begins decreasing and if resistor 40 is larger than resistor 42, the voltage at point B eventually becomes a negative value. The waveform of the voltage at point B is shown by the waveform labeled B in FIG. 2.

Figure 2:
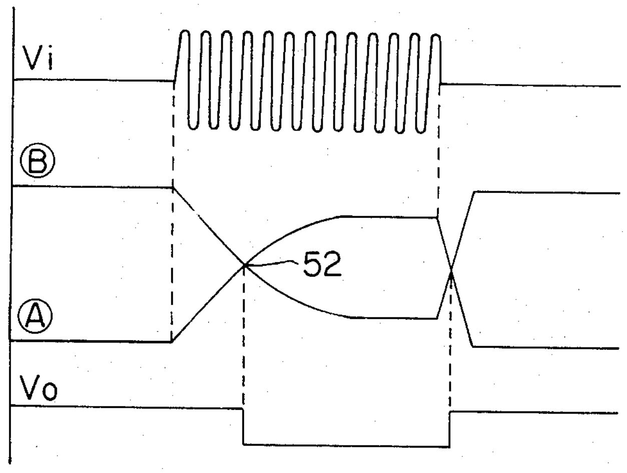
FIG. 2 shows a series of waveforms useful in understanding the operation of the circuit shown in FIG. 1.

At the time the voltage at point A and voltage at point B become equal, as shown at point 52 in FIG. 2, the output voltage $V_o$ from differential amplifier 46 switches from the initial positive voltage to a negative voltage, as shown by the waveform labeled $V_o$ in FIG. 2. As can be seen from FIG. 2, the output voltage $V_o$ switches after several cycles of the sinusoidal input signal have occurred. Thus, only one or two noise pulses will not cause the output signal $V_o$ to change value. Further, if the noise pulses are only of one polarity, they will render only one of the transistors 16 or 18 conductive and thus, only affect one of the curves labeled A and B in FIG. 2. This, in turn, means the two voltages at points A and B cannot change polarity with respect to one another. Hosever if the noise pulses are of both polarities, it requires more time for the voltages at points A and B to change polarity with respect to one another and thus the probability of this occurring is greatly reduced.

After the sinusoidal wave ceases, capacitors 26 and 30 again become charged to the initial voltages of +V and −V volts respectively. This, in turn, renders transistors 32 and 34 nonconductive and points A and B return to −V volts and +V volts respectively and the output signal $V_o$ returns to a positive voltage.

One circuit proved to operate from 1200 hertz to 2200 hertz utilizes the following circuit values:

| | |
|---|---|
| Source +V | +12 Volts |
| Source −V | −12 Volts |
| Capacitors **26** and **28** | 47 MF |
| Resistor 14 | 20 Kohm |
| Resistors **20, 22, 38** and **42** | 15 Kohm |
| Resistors **24** and **28** | 30 Kohm |
| Resistors **36** and **40** | 3 Kohm |
| Resistors **44** and **48** | 100 Kohm |
| Transistors **16** and **34** | 2N3904 |
| Transistors **18** and **32** | 2N3906 |

What is claimed is:

1. A detector circuit for providing an output signal indicating the presence of an established alternating current input signal applied thereto comprising:

first and second capacitors for storing energy said first and second capacitors each having a first and a second terminal, said first terminals being coupled together and to a point of reference potential;

input means for causing said first and said second capacitors to store an initial energy prior to the provision of said input signal and for periodically deenergizing said first capacitor during the occurrence of the positive half cycles of said input signal, and for periodically deenergizing said second capacitor during the occurrence of the negative half cylces of said input signal, said input means including first and second charging paths, each path including first and second series coupled resistive elements, said first charging path being coupled between a source of voltage of one polarity and said second terminal of said first capacitor, and said second charging path being coupled between a source of voltage of opposite polarity and said second terminal of said second capacitor; and wherein said input means further includes first and second switching means, said first switching means being coupled between the junction of said first and second resistive elements of said first charging path and said point of reference potential and passing current only during the positive half cycles of said input signal, said second switching means being coupled between the junction of said first and second resistive elements of said second charging path and said point of reference potential and passing current only during the negative half cycles of said input signal;

first amplifying means responsive to the energy stored by said first capacitor for providing a signal which changes from a first to a second value as the energy stored by said first capacitor decreases;

second amplifying means responsive to the energy stored by said second capacitor for providing a signal which changes from a third to a fourth value as the energy stored by said second capacitor decreases, said first and second amplifying means signals changing polarity with respect to one another as said energy stored by said first and second capacitors decreases, said first and fourth values being of one polarity and said second and third values being of another polarity; and comparing means for providing said output signal whenever said first and second amplifying means signals change polarity with respect to one another.

2. The invention according to claim 1 wherein said first and second switching means are first and second transistors respectively, said first transistor being rendered conductive by a positive voltage said second transistor being rendered conductive by a negative voltage.

3. The invention according to claim 2:

wherein said first transistor is an N-P-N transistor having an emitter coupled to said point of reference potential, a collector coupled to said junction of said first and second resistive elements of said first charging path, and a base responsive to said input signal; and wherein said second transistor is a P-N-P transistor having an emitter coupled to said point of reference potential, a collector coupled to said junction of said first and second resistive elements of said second charging path, and a base responsive to said input signal.

4. The invention according to claim 1:

wherein said first and second energy storing devices are first and second capacitors respectively;

wherein said input means causes the voltage at one end of said first capacitor to initially assume a first voltage of one polarity and to be reduced in magnitude from said first voltage after said input signal occurs and further causes the voltage at one end of said second capacitor to initially assume a second voltage of the opposite polarity and to be reduced in magnitude from said second voltage after said input signal occurs;

wherein said first amplifying means includes a first transistor having first and second main electrodes and a control electrode, means for coupling said first main electrode to a third voltage of said one polarity, means for coupling said second main electrode to a fourth voltage of said opposite polarity and means for coupling said control electrode to said one end of said first capacitor, said first amplifying means signal being the signal at said second main electrode of said first transistor; and wherein said second amplifying means includes a second transistor having first and second main electrodes and a control electrode, means for coupling said first main electrode to a fifth voltage of said opposite polarity, means for coupling said second main electrode to a sixth voltage of said one polarity and means for coupling said control electrode to said one end of said second capacitor, said second amplifying means signal being the signal at said second main electrode of said second transistor.

5. The invention according to claim 4 wherein said first and second voltages are respectively at least as large in magnitude as said third and fifth voltages.

6. The invention according to claim 5 wherein said comparing means includes a differential amplifier.

7. The invention according to claim 6:

wherein said first transistor is a P-N-P transistor and said second transistor is an N-P-N transistor;

wherein said first main electrodes of said first and second transistors are emitters, said second main electrodes of said first and second transistors are collectors and said control electrodes of said first and second transistors are bases; and wherein said means for coupling said first and second main electrodes to said voltages include resistive elements.

8. A detector circuit for providing an output signal after the occurrence of a predetermined number of cycles of an alternating current input signal comprising:

first and second transistors of one conductivity, each having a collector, an emitter and a base;

third and fourth transistors of opposite conductivity, each having a collector, an emitter and a base;

first and second capacitor means, each having first and second terminals, said first terminals being coupled a point of reference potential;

means for coupling said input signal to said bases of said first and third transistors;

means for coupling the emitters of said first and third transistors to said point of reference potential;

means, including a first resistor means, for coupling a source of voltage of a first polarity to the collector of said first transistor;

means, including a second resistor means, for coupling a source of voltage of a second polarity to the collector of said second transistor, said first and second polarities being such that current can flow through said first and third transistors whenever said first and third transistors are rendered conductive by said input signal;

means, including a third resistor means, for coupling the collector of said first transistor to the second terminal of said first capacitor;

means, including a fourth resistor means, for coupling the collector of said third transistor to the second terminal of said second capacitor;

means for coupling the second terminal of said first capacitor to the base of said fourth transistor;

means for coupling the second terminal of said second capacitor to the base of said third transistor;

means, including a fifth resistor means, for coupling the emitter of said fourth transistor to said source of voltage of said first polarity and, further including a sixth resistor means, for coupling the collector of said fourth transistor to said source of voltage of said second polarity;

means, including a seventh resistor means, for coupling the emitter of said third transistor to said source of voltage of said second polarity and, further including an eighth resistor means, for coupling the collector of said third transistor to said source of voltage of said first polarity, and;

differential amplifier means responsive to the voltages at the collectors of said second and fourth transistors, for providing said output signal whenever said collector voltages change polarities with respect to one another.

9. The invention according to claim 8:

wherein said first and third transistors are N-P-N transistors and said second and fourth transistors are P-N-P transistors; and wherein said first polarity is positive and said second polarity is negative.

* * * * *